US012811906B2

(12) United States Patent
Srikantan et al.

(10) Patent No.: US 12,811,906 B2
(45) Date of Patent: Nov. 24, 2026

(54) INTRA-ENTERPRISE CONNECTION PLATFORM TO A CLOUD SERVICE USING BORDER GATEWAY PROTOCOL

(71) Applicant: AT&T Intellectual Property I, L.P., Atlanta, GA (US)

(72) Inventors: Sekhar Srikantan, Flemington, NJ (US); Connie Anderson, Hillsborough, NJ (US); Ali Nikain, Atlanta, GA (US); Ivetta Pogosova, Plainsboro, NJ (US); Kevin Le, Jackson, NJ (US); Nagaraju Sheela, Rockford, IL (US); Tamir Merhav, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 591 days.

(21) Appl. No.: 18/341,973

(22) Filed: Jun. 27, 2023

(65) Prior Publication Data

US 2025/0007878 A1 Jan. 2, 2025

(51) Int. Cl.

| | |
|---|---|
| ***H04L 61/5007*** | (2022.01) |
| ***H04L 12/46*** | (2006.01) |
| ***H04L 45/745*** | (2022.01) |
| ***H04L 61/10*** | (2022.01) |
| *H04L 101/668* | (2022.01) |

(52) U.S. Cl.

CPC ...... *H04L 61/5007* (2022.05); *H04L 12/4641* (2013.01); *H04L 45/745* (2013.01); *H04L 61/10* (2013.01); *H04L 2101/668* (2022.05)

(58) Field of Classification Search

CPC . H04L 61/5007; H04L 61/10; H04L 12/4641; H04L 45/745; H04L 2101/668

See application file for complete search history.

(56) References Cited

U.S. PATENT DOCUMENTS

| | | | | |
|---|---|---|---|---|
| 10,742,721 | B1 * | 8/2020 | Wagner | H04L 67/10 |
| 11,228,573 | B1 * | 1/2022 | Rangasamy | H04L 12/40006 |
| 11,777,899 | B1 * | 10/2023 | Durrani | H04L 61/5014 709/245 |
| 12,231,325 | B2 * | 2/2025 | Mishra | H04L 45/741 |
| 2016/0191341 | A1 * | 6/2016 | Sivasankaran | H04L 41/5051 709/220 |
| 2020/0162359 | A1 * | 5/2020 | Borkar | H04L 67/53 |
| 2021/0359948 | A1 * | 11/2021 | Durrani | H04L 12/66 |
| 2025/0184182 | A1 * | 6/2025 | Lochhead | H04L 43/04 |

* cited by examiner

*Primary Examiner* — Blake J Rubin

(74) *Attorney, Agent, or Firm* — Guntin & Gust, PLC; Mark Wilinski

(57) ABSTRACT

Aspects of the subject disclosure may include, for example, establishing a Layer 2 multipoint virtual private network (VPN) among a plurality of sites connected via a switched, shared or dedicated ethernet provided by a service provider, where the plurality of sites correspond to multiple locations of a target enterprise, determining a count of the plurality of sites that requires a connection to one or more cloud service providers over a common backbone network of the service provider, generating a VLAN that conforms to a Border Gateway Protocol (BGP), assigning a block of IP addresses to a network of the target enterprise, based on the determined count, assigning two or more subnets having IP addresses of both IPv4 and IPv6 address families with respect to the VLAN, and connecting the plurality of sites to the one or more cloud service providers. Other embodiments are disclosed.

20 Claims, 12 Drawing Sheets

200

500

600

800

| CIDR | Subnet Mask | Wildcard Mask | # of IP Address | # of Usable IP Address |
|---|---|---|---|---|
| /32 | 255.255.255.255 | 0.0.0.0 | 1 | 1 |
| /32 | 255.255.255.254 | 0.0.0.1 | 2 | 2* |
| /30 | 255.255.255.252 | 0.0.0.3 | 4 | 2 |
| /29 | 255.255.255.248 | 0.0.0.7 | 8 | 6 |
| /28 | 255.255.255.240 | 0.0.0.15 | 16 | 14 |
| /27 | 255.255.255.224 | 0.0.0.31 | 32 | 30 |
| /26 | 255.255.255.192 | 0.0.0.63 | 64 | 62 |
| /25 | 255.255.255.128 | 0.0.0.127 | 128 | 126 |
| /24 | 255.255.255.0 | 0.0.0.255 | 256 | 254 |
| /23 | 255.255.254.0 | 0.0.1.255 | 512 | 510 |
| /22 | 255.255.252.0 | 0.0.3.255 | 1,024 | 1,022 |
| /21 | 255.255.248.0 | 0.0.7.255 | 2,048 | 2,046 |

FIG. 11

INTRA-ENTERPRISE CONNECTION PLATFORM TO A CLOUD SERVICE USING BORDER GATEWAY PROTOCOL

FIELD OF THE DISCLOSURE

The subject disclosure relates to an intra-enterprise connection platform to a cloud service using border gateway protocol (BGP).

BACKGROUND

Network connectivity solutions involving different entities, different service providers, different network protocols, etc. have been implemented with complex, inefficient and manual intensive workflow processes. Multiple work centers of a service provider may compete to address requests for a large number of different network connection requests.

Conventional networking solutions may treat various participating locations or sites that belong to the same enterprise or business entity equally and restrict connectivity to internal resources.

Participating sites within the same enterprise may need to access services outside of their LAN/VLAN/WAN nodes. For example, Business-to-Business (B2B) services provided by large enterprises, or services provided by globally established Cloud Service Providers (CSP), may require connectivity solutions that can be established, scaled and maintained with reliability and resiliency. These services are in their nascent stages and are bound to grow and become prevalent in the near future.

BRIEF DESCRIPTION OF THE DRAWINGS

Reference will now be made to the accompanying drawings, which are not necessarily drawn to scale, and wherein:

FIG. 11 illustrates IP addresses relating to subnets of FIG. 10 in accordance with various aspects described herein.

DETAILED DESCRIPTION

Figure 1:
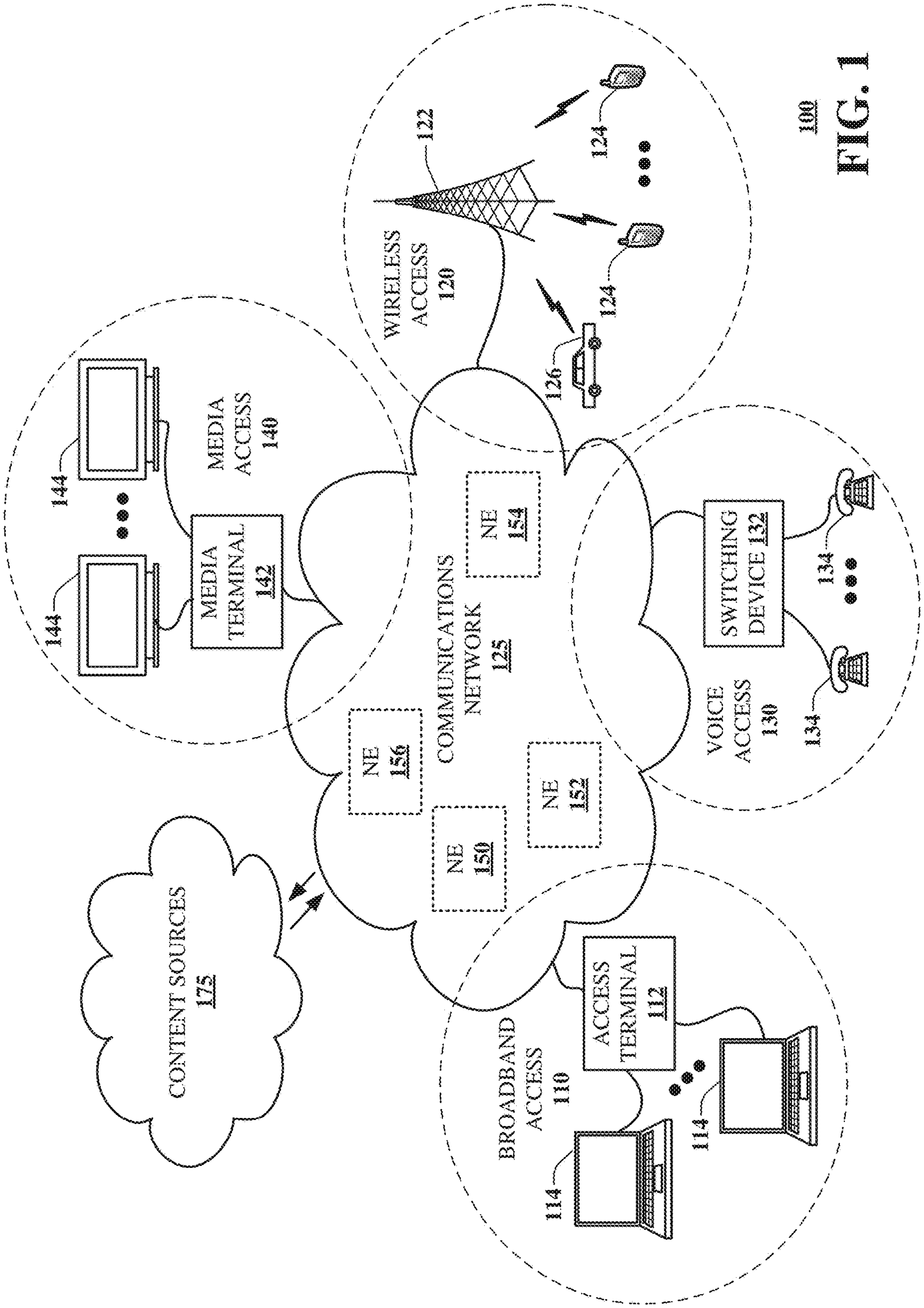
FIG. 1 is a block diagram illustrating an exemplary, non-limiting embodiment of a communications network in accordance with various aspects described herein.

The subject disclosure describes, among other things, illustrative embodiments for an intra-enterprise connection platform that provides connection to a cloud service provider using a multi Border Gateway Protocol (mBGP). Other embodiments are described in the subject disclosure.

One or more aspects of the subject disclosure is directed to a device which includes a processing system including a processor and a memory that stores executable instructions that, when executed by the processing system, facilitate performance of operations. The operations include, establishing a Layer 2 multipoint virtual private network (VPN) among a plurality of devices connected via a switched, shared or dedicated ethernet, where a group of the plurality of devices belong to a single entity network including a plurality of different sites, connecting one or more participating sites among the plurality of different sites to a cloud service provider over a common backbone network by: generating a VLAN that conforms to a Border Gateway Protocol (BGP), assigning a block of IP addresses to the single entity network, assigning a subnet having IP addresses of both IPv4 and IPv6 address families with respect to the VLAN, and configuring a Layer 3 routing instance on a provider edge router by mapping the IP addresses of both IPv4 and IPv6 address families to routes in a routing table contained in the provider edge router, thereby enabling the one or more participating sites to be configured to access the cloud service provider.

One or more aspects of the subject disclosure are directed to a method which includes, connecting, a processing system including a processor, a plurality of subscriber networks via a switched, shared or dedicated Ethernet connection in a wired network, where the plurality of subscriber networks includes a first network and a second network, providing, by the processing system, an on-demand application that enables a user to selectively activate or deactivate a network connection to a cloud service provider, receiving, by the processing system, a request for activating the network connection, determining, by the processing system, a number of sites within the first network that requires a connection to one or more cloud service provider over a common backbone network of the service provider, generating, by the processing system, a VLAN that conforms to a Border Gateway Protocol (BGP), assigning, by the processing system, a block of IP addresses to the first network, based on the determined number, assigning, by the processing system, two or more subnets having IP addresses of both IPv4 and IPv6 address families with respect to the VLAN, and connecting, by the processing system, the number of sites within the first network to the one or more cloud service providers.

One or more aspects of the subject disclosure are directed to a device which includes a processing system including a processor and a memory that stores executable instructions that, when executed by the processing system, facilitate performance of operations. The operations include establishing a Layer 2 multipoint virtual private network (VPN) among a plurality of sites connected via a switched, shared or dedicated Ethernet connections provided by a service provider, where the plurality of sites correspond to multiple locations of a target enterprise, determining a count of the plurality of sites that requires a connection to one or more cloud service providers over a common backbone network of the service provider, generating a VLAN that conforms to a Border Gateway Protocol (BGP), assigning a customer edge wide area network address of IPv6 family and optionally for IPv4 family if not provided by the CSP, and connecting the plurality of sites to the one or more cloud service providers.

Referring now to FIG. 1, a block diagram is shown illustrating an exemplary, non-limiting embodiment of a communication system 100 in accordance with various aspects described herein. For example, at least a part of the system 100 (e.g., a broadband access 110, communications network elements 150, 151) can facilitate in whole or in part a platform for enabling users to selectively activate or deactivate network connections to a cloud service provider or subscriber networks connected via a switched, shared or dedicated Ethernet. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
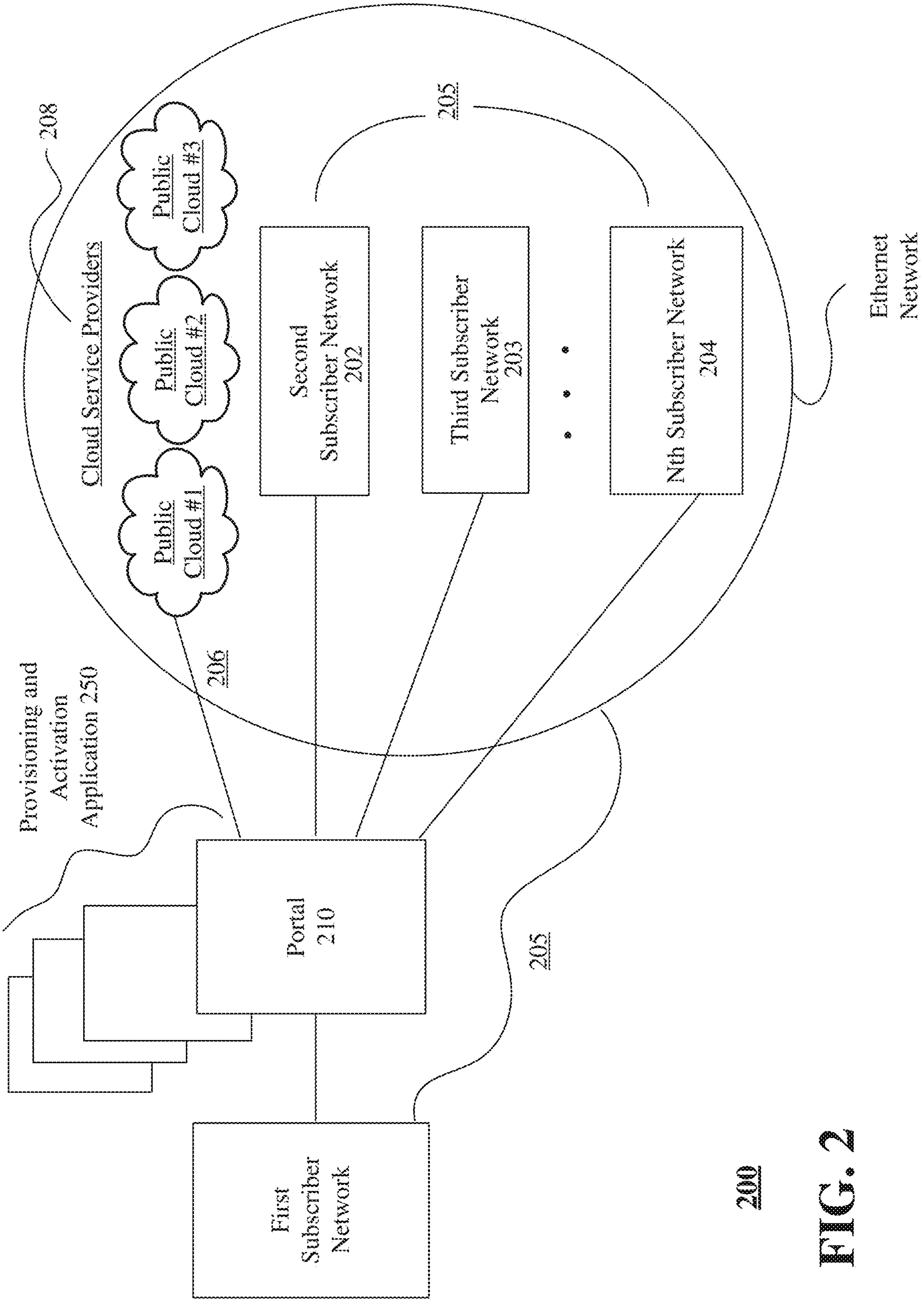
FIG. 2 is a block diagram illustrating an example, non-limiting embodiment of a network connection activation/deactivation platform in accordance with various aspects described herein.

FIG. 2 is a block diagram illustrating an example, non-limiting embodiment of a network connection activation/deactivation platform 200 for enabling users to selectively activate or deactivate network connections to a cloud service provider or subscriber networks connected via a switched, shared or dedicated Ethernet functioning within the communication network of FIG. 1 in accordance with various aspects described herein. The network connection activation/deactivation platform 200 facilitates network connections 205 among a plurality of subscriber networks having a first subscriber network 201, a second subscriber network 202, and a Nth subscriber network 204. The platform 200 further facilitates network connections 206 to one or more cloud service providers 208. FIG. 2A depicts Public Cloud 1, Public Cloud 2 and Public Cloud 3 by way of example only.

Figure 3:
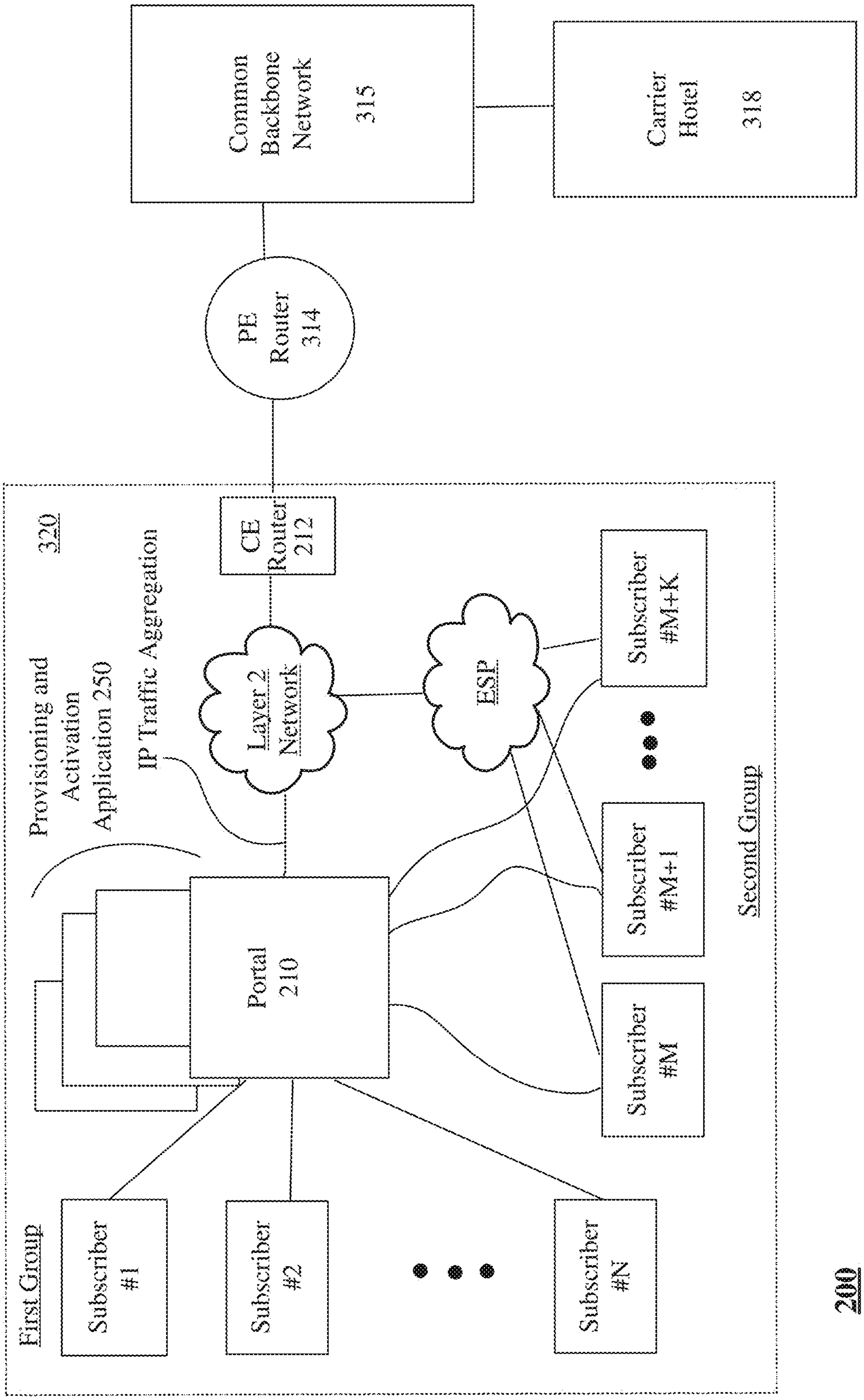
FIG. 3 illustrates a block diagram of subscriber networks connected with an Ethernet network in accordance with various aspects described herein.

In various embodiments, the plurality of subscriber networks 201, 202, 203, 204 are connected to Ethernet connections provided and operated by a service provider. In some embodiments, the Ethernet connections can be switched, shared, or dedicated. The plurality of subscriber networks 201, 202, 203, 204 have connections to a provider edge of the service provider, as shown in FIG. 3. In some embodiments, the service provider may be a local exchange carrier (LEC) that provides telecommunication services within designated areas. The service provider has access to connection points of the plurality of subscriber networks 201, 202, 203 and 204 based on wired systems which are extended to premises of the plurality of subscriber networks.

Additionally, the plurality of subscriber networks 201, 202, 203, 204 may communicate using a virtual private network (VPN) within their own networks. For instance, the first subscriber network 201 may have multiple sites geographically distributed which communicate and exchange data via the VPN. Multiple sites that belong to the same enterprise may communicate via the virtual private network (VPN) to facilitate secure communications and exchange data within the same enterprise.

In various embodiments, the first subscriber network 201 is connected to a portal 210. In some embodiments, the portal 210 is at least a part of a provisioning and activation application that provides users with access to various network connection options. The network connection activation/deactivation platform 200 can be implemented with a stack of applications which facilitate a set of nested workflows. As depicted in FIG. 2, the second subscriber network 202 is also connected to the portal 210. In some situations, subscriber entities operating the plurality of subscriber networks 201, 202, 203 and 204 may be customers, users, business partners, clients, etc. and need to communicate and exchange data in order to perform tasks together. In various embodiments, access to the portal 210 can be a part of extended services to the connection services based on the Ethernet connections. In other words, the service provider may offer the extended services to existing subscriber networks which have access to the Ethernet connections. In some embodiments, the first subscriber network 201 and the second subscriber network 202 have signed up for the extended services and can access the portal 210. Upon authorization by the first and the second subscriber networks the first subscriber network 201 and the second subscriber network 202 can request, via the portal 210, connections and exchange data with other subscriber networks or the cloud service providers 208 as needed, on an on-demand basis. The connection via the portal 210 is secure and protected by using the VPN.

Although different enterprises or companies may not share data and access to the networks may be restricted to internal devices, it is convenient and time and cost effective for the different enterprises to selectively enable or disable connections based on predetermined and mutually agreed terms and conditions. Additionally, the first subscriber and the second subscriber may be enabled to selectively activate or deactivate, or modify particular network connections as needed, via the portal 210. In other words, the portal 210 can provide the functionality of a self-service, on-demand entry points for the subscribers to request connections to other subscriber networks. In some embodiments, the portal 210 may serve as an entry point for subscribers to "order" the network connections as an orderable item. In addition, the order of the network connections is modifiable.

In various embodiments, the portal 210 is used to coordinate connections to one or more cloud service providers. Cloud services provide powerful computing resources and services that enterprises can use such computing resources as needed without having to purchase and maintain hardware and software resources. Due to scalability and convenience, enterprises have constant needs to use cloud services and enterprises can selectively enable or disable connections to cloud services via the portal 210. The portal 210 can provide the functionality of a self-service, on-demand entry points for the subscribers to request connections to the cloud services.

Figure 4:
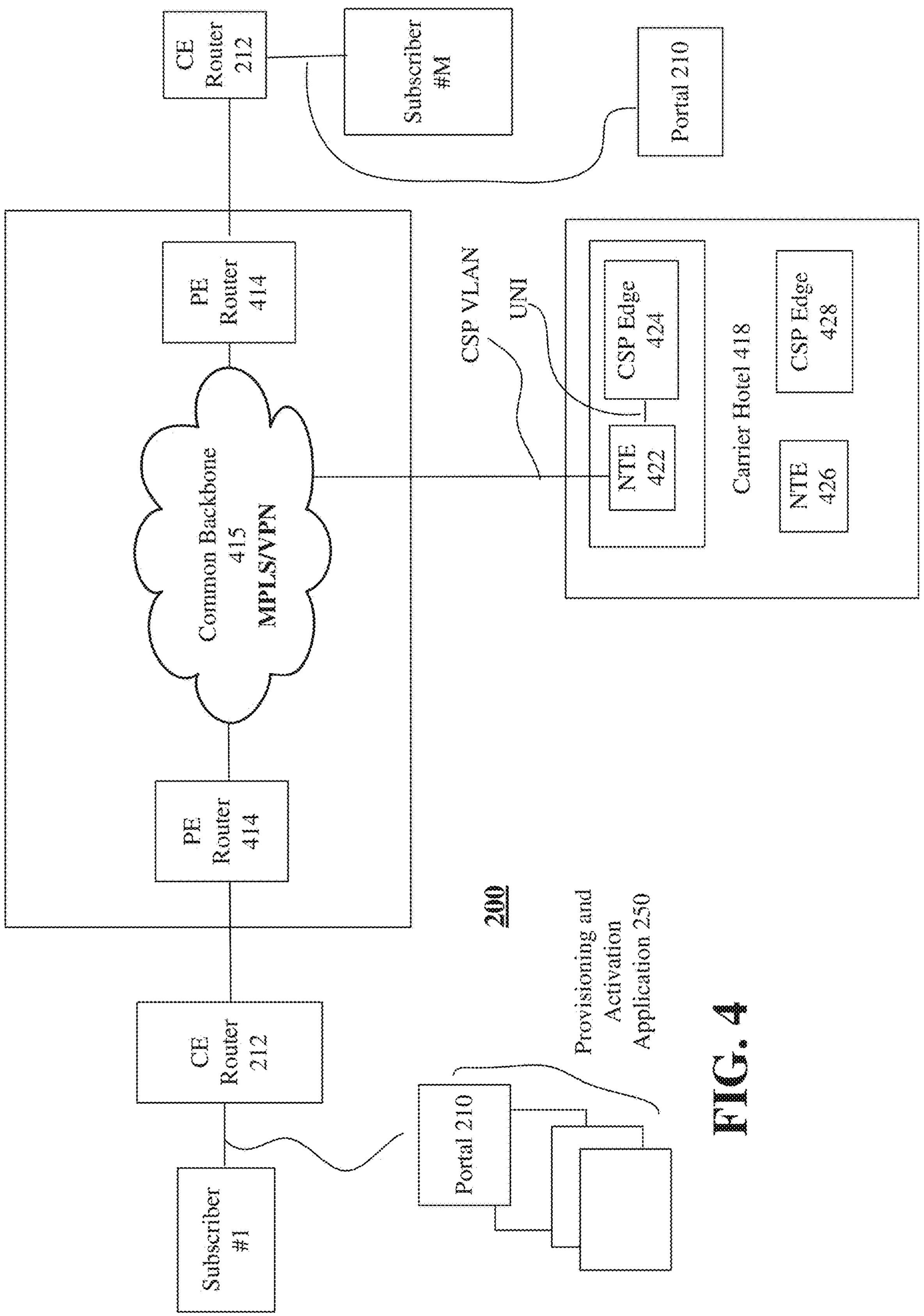
FIG. 4 illustrates a block diagram of a common backbone network in accordance with various aspects described herein.

As described above, in some embodiments, the provisioning and activation application 250 can implement the portal 210 as depicted in FIGS. 2 through 4. The provisioning and activation application 250 further enables the first subscriber, the second subscriber or both to select a plurality of network configuration attributes as another orderable item.

FIG. 3 illustrates a block diagram of subscriber networks 320 connected via Ethernet connections in accordance with various aspects described herein. The subscriber networks 320 include a plurality of subscriber entities such as large enterprises, small business, individuals, etc. In various embodiments, the subscriber entities operate their own networks which serve multiple sites at different geographical or network locations. Multiple sites that belong to the same enterprise may communicate via the virtual private network (VPN) to facilitate secure communications and exchange data within the same enterprise.

In various embodiments, a service provider provides switched, shared or dedicated Ethernet connections to the subscriber entities. In some embodiments, as discussed above, the service provider is a LEC that provides telecommunication services to the subscriber entities. Accordingly, the service provider operates telecommunication networks and wired systems that deliver telecommunication services to the subscriber entities. For instance, the service provider can provide the last mile access such that a portion of the telecommunications network chain may physically reach the subscriber entities' premises.

In various embodiments, the subscriber entities can be divided into a first group and a second group, as depicted in FIG. 3. The first group includes Subscriber entities No. 1 through No. N. For the first group, the service provider serves as an incumbent LEC and has direct access to the first group of subscriber entities. For the second group of Subscriber entities, the service provider may have access via an External Service Provider (ESP). For the subscriber entities of the first group, the service provider can aggregate IP traffic of the subscriber entities. Regardless of whether the service provider has the direct access or not, both the first group and the second group of subscriber entities have access to a Layer 2 network provided and operated by the service provider, as depicted in FIG. 3.

In various embodiments, the telecommunication network based on the wired systems corresponds to a data link layer according to Layer 2 in the Open Systems Interconnection (OSI) model. The data link layer is the protocol layer that transfers data between adjacent network nodes in a wide area network (WAN) or between nodes on the same local area network (LAN). The data link layer is to ensure a reliable transmission and control access to the transmission medium. The data link layer handles local delivery of frames between devices on the same LAN and data link frames do not cross the boundaries of a local network. Thus, internetwork routing and global addressing such as packet delivery based on IP addresses are handled by higher layers in the OSI model than the data link layer. The data link layer mainly handles local delivery and local addressing.

Regardless of whether the subscriber entities are the first group or the second group, the subscriber entities have access to the Layer 2 network provided by the service provider. In some embodiments, the subscriber entities are connected to a LAN or a virtual LAN (VLAN). In some embodiments, the service provider can access connection nodes in the LAN or VLAN with identifications and establish network configurations of the connection nodes such as ports assignment, bandwidth setup, etc. The service provider can activate, deactivate or modify connections between particular connection nodes. Additionally, the service provider can access one or more cloud service providers via a common VPN. As depicted in FIG. 3, the subscriber networks 320 communicate through a common backbone network 315 of the service provider via a set of routers 212 and 314. FIG. 3 illustrates the routers 212 and 314 for convenience of descriptions, but the present disclosure is not limited thereto.

FIG. 4 illustrates a block diagram of the common backbone network 415 in accordance with various aspects described herein. In various embodiments, a large number of entities are subscribed to the telecommunication services by the service provider and such subscriber entities are connected via their virtual local area networks (VLANs) to exchange data among multiple sites distributed at different geographical or network locations. The Layer 2 network such as VLANs can be extended across the multiple sites on the same broadcast domain by using the VPN. The VPN is a network shared between organizations and each VPN has a respective policy of addressing, routing and security. The service provider ensures that traffic belonging to different subscriber entities is isolated and the respective policy is respected. The service provider manages the VPN, and contracts, such as a service agreement, are used to specify terms relating to network availability, transmission rates between sites, and other transmission details in connection with the VPN.

In some embodiments, the VPN connection may be implemented with a route-based IPSec tunnel between the multiple sites and data travelling over the VPN may not be visible to a physical network surrounding the VPN, thereby enabling the secure communications. In other embodiments, the Multi-Protocol Label Switching (MPLS) technique can be used to direct and carry data between network nodes over the common backbone network 415 of the service provider. The MPLS technique uses labels to route packets, instead of using IP addresses, and can be independent of protocol and data.

In various embodiments, different types of the VPN may be used in the network connection activation/deactivation platform 200, including Layer 2 VPNs that use MPLS labels to transport data. Layer 2 VPNs may be used to facilitate the Layer 2 network. Layer 2 VPNs include Virtual Private LAN Switching Service (VPLS) which is an end-to-end service such as an Ethernet multipoint service. The VPLS is the LAN service because a multipoint connectivity among participant endpoints is provided like a LAN.

In other embodiments, Layer 3 MPLS VPNs may be used to transport data. When Layer 2 VPNs are used, service provider systems forward subscriber data packets based on Layer 2 information. Layer 3 MPLS VPNs are referred to as a Border Gateway Protocol (BGP)-VPN because a multiprotocol BGP is used to transport the traffic. The communication occurs between routers including Provider Edge routers (PEs), which sit on the edge of the service provider's network, as shown in FIG. 4 (e.g., the PE router 414). The PE router 414 manages tables for storing routing information. VPN routing and forwarding instances (VRF) table includes subscriber VPN routes associated with one or more directly connected sites (i.e., CE routers).

In various embodiments, the VRF table is associated with logical or physical interfaces which can share the same routing information. When a route is defined for a particular VPN site, the corresponding VRF is informed based on routing context associated with an incoming interface. The routing context manages several instances of a particular routing protocol, but routing information between the contexts is separated. A routing distinguisher is added to the beginning of an IPv4 route before the route is distributed in the BGP and used for exchanging VPN routes between the PE routers 414. Dynamic routing protocols are used to exchange routing information for the Layer 3 VPN. Routes are imported into VRFs, and the PE router 414 can transmit the routes to the relevant VPN sites, providing the routing information that ensures connectivity between the VPN sites.

In various embodiments, the network connections activation/deactivation platform 200 according to the present disclosure enables an interconnect of Layer 2 and Layer 3 connections substantially seamlessly by generating a new service instance or a VPN/VRF. Additionally, access to multiple sites of a given customer (i.e., the multiple sites that belong to the same enterprise) to a cloud service provider can be enabled using multiple subnets in order to provide efficient routing and eliminating latency issues.

In various embodiments, the subscriber networks can be connected and communicate with one or more cloud service providers via the VLAN. For instance, the subscriber #1 may be connected to a carrier hotel 418 via the VLAN. At the carrier hotel 418, all of major cloud service providers are present to provide their presence for Tier-1 customers in order to co-locate access devices for high capacity/bandwidth connectivity in a secure facility with temperature control and backup power to ensure high availability.

In various embodiments, the subscriber #1 may select a desired cloud service provider among cloud service providers present at the carrier hotel 418 and communicate with the desired cloud service provider.

As depicted in FIG. 4, a network termination equipment (NTE) 426 is present at the carrier hotel 418. The NTE 426 connects the cloud service provider's equipment or data to the service provider's equipment or network that comes into the carrier hotel 418. In some embodiments, the NTE 422 is connected to a cloud service provider edge 424 via a user network interface (UNI) in the carrier hotel 418. In some embodiments, the user network interface (UNI) is a demarcation point where the public switched telephone network of the service provider ends.

Figure 5:
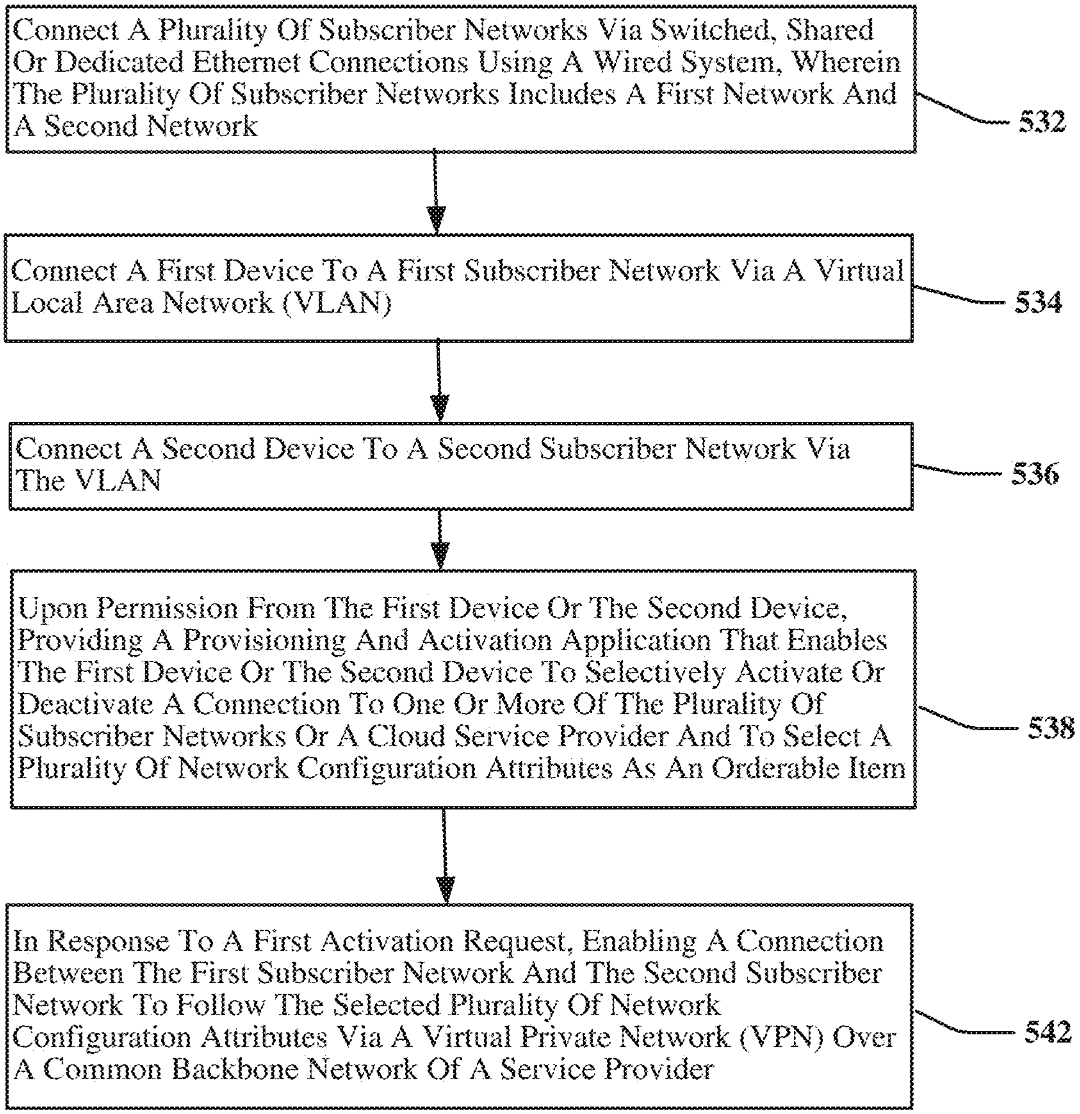
FIG. 5 depicts an illustrative embodiment of a method in accordance with various aspects described herein.

FIG. 5 depicts an illustrative embodiment of a method in accordance with various aspects described herein. In various embodiments, a plurality of subscribers are subscribed to telecommunication services provided by a service provider (at 532). In some embodiments, the telecommunication services include telephone services and the service provider can be a local exchange carrier (LEC). The telecommunication services may be based on wired systems such as the switched, shared or dedicated Ethernet network. A first subscriber and a second subscriber among the plurality of subscribers operate a first subscriber network and a second subscriber network, respectively. In the first network, a plurality of devices including a first device is connected via a VLAN and exchanges data in the first subscriber network (at 534). In the second subscriber network, a plurality of devices including a second device is connected via a VLAN and exchanges data (at 536). Data traffic that belongs to the first subscriber network or the second subscriber network is exchanged among multiple sites via a VPN such that secure communications are enabled over a public network (at 538 and 542). More specifically, upon authorization from the first device or the second device, the provisioning and activation application is provided which enables the first device or the second device to selectively activate or deactivate a connection to one or more of the plurality of subscriber networks or a cloud service provider is provided (at 538). The provisioning and activation application further enables the first device or the second device to select a plurality of network configuration attributes as an orderable item (at 538).

In response to a first activation request, a connection between the first subscriber network and the second subscriber network to follow the selected plurality of network configuration attributes is enabled via a virtual private network (VPN) over a common backbone network of a service provider (at 542). In this process, the first device and the second device initiate a handshake process to identify each device and/or each network and authenticate the connection request. In some embodiment, the provisioning and activation application facilitates this process to prompt relevant information and notifications to the first device and the second device.

In various embodiments, the first subscriber network and the second subscriber network have access to a provider edge router based on the subscription of services provided by the service provider (at 542). In some embodiments, the first subscriber network and the second subscriber network have a respective customer edge router that is in communication with the provider edge router.

In various embodiments, the first device sends a connection request as a host or a client and may not be limited to one of the host and the client. The connections are tagged as 'Host' or 'Client' based on a preference. Host connections provide the same service to multiple clients. Client connections have the ability to access multiple hosts and host sites.

Figure 6:
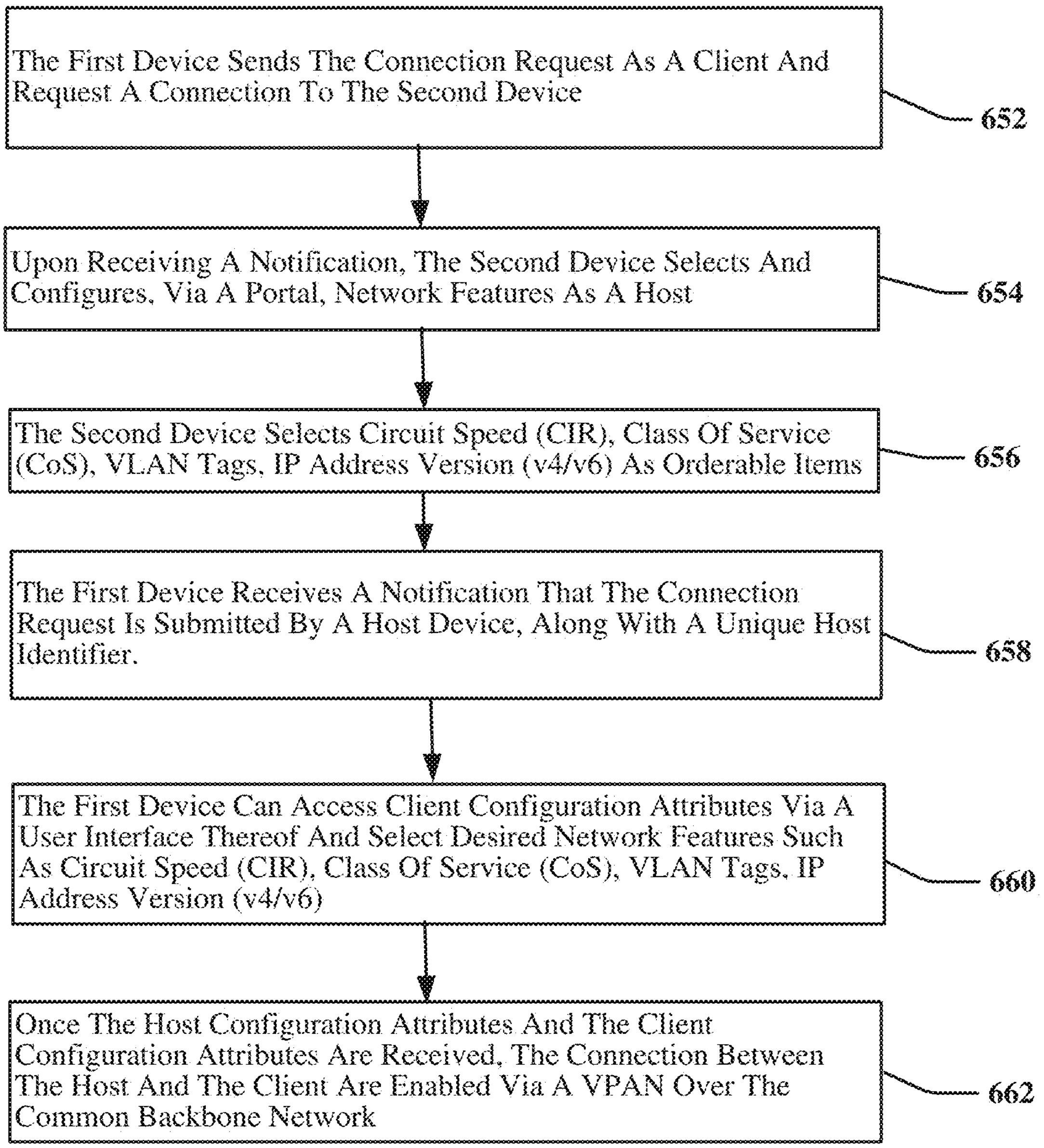
FIG. 6 depicts an illustrative embodiment of another method in accordance with various aspects described herein.

FIG. 6 depicts an illustrative embodiment of another method 600 in accordance with various aspects described herein. In particular, FIG. 6 further illustrates the processes 538 and 542 of FIG. 5. In some embodiment, the first device sends the connection request as a client and requests a connection to the second network (at 652).

In various embodiments, the second device of the second subscriber network receives a notification for the connection request. In order to enable the connection with the first device of the first network, the second device selects and configures, via the portal 210, network features as a plurality of network configuration attributes (at 654). In the request connection, the second device operates as a host and can select host connection configuration attributes among the plurality of network configuration attributes. For instance, the second device can select the network features such as Circuit Speed (CIR), Class of Service (CoS), VLAN Tags, IP address version (v4/v6) regarding a particular connection (at 656). In some embodiments, the portal 210 (FIGS. 2-4) prompts different network features in the form of webpages on an interface of the second device and permits the second device to select the network features. The network features such as Circuit Speed (CIR), Class of Service (CoS), VLAN Tags, IP address version (v4/v6) are orderable and modifiable by the second device (at 656). In some embodiments, the second device can set a valid time duration to the connection with the first device and selectively activate and deactivate the connection accordingly. The second device can perform activation and/or deactivation by accessing the portal 210 as needed. The portal 210 may facilitate on-demand based connections between businesses (e.g., the first subscriber, the second subscriber, etc.) and between businesses and cloud service providers.

Once the host connection configuration attributes are entered and submitted from the second device, the first device receives a notification that the connection request is submitted by a host device (i.e., the second device), along with a unique host identifier (at 658). The first device sends a confirmation for the connection request to the portal 210. Subsequently, the first device can access client configuration attributes via a user interface thereof and select desired network features such as Circuit Speed (CIR), Class of Service (CoS), VLAN Tags, IP address version (v4/v6) (at 660). By way of example, webpages are prompted to the user interface of the first device to display various network features and the first device can make a selection of these various network features. Additionally, or alternatively, the first device may be presented with pricing information for selecting these various network features.

In various embodiments, once the host configuration attributes and the client configuration attributes are received by the service provider via the portal 210, the connection between the first device of the first subscriber network and the second device of the second subscriber network is enabled and the first device and the second device are connected via a VPN over the common backbone network of the service provider (at 662). Data exchanged between the first device and the second device will be secure and protected via the VPN.

In various embodiments, the network connection activation/deactivation platform 200, including the portal 210, implements a robust, scalable and flexible design by defining entry points or end points that support different Layer2 and Layer3 provisioning requests from external ordering platforms. Users of the subscriber networks can order network features to suit their needs. For instance, network features such as Circuit Speed (CIR), Class of Service CoS, VLAN Tags, and IP address version (v4/v6) are orderable and modifiable on-demand by using the platform 200, for instance, via the portal 210. Additionally, one or more circuits can be configured with packet filtering attributes, and the packet filtering attributes are specifically generated and unique and correspond to a community value string of a router configuration as a combination of a VRF instance and the unique host identifier.

In various embodiments, a workflow engine may be used to throttle pre-processing functions like order validation, bandwidth checks, and object creation of a VPN, site, a customer record and premise, etc. By way of example only, the implementation of the network services activation/deactivation platform 200 utilizes a workflow embedded open-source based microservice. This microservice invokes the existing Business Process Execution Language (BPEL) workflow for extensive reuse of well-established Design & Assign and activation flows. The BPEL workflow layer allows users to define a workflow for handling different transactions. This workflow-within-workflow may make a data model compatible between standard products and enhanced Host-Client modeled products. Additionally, a set of nested workflows coordinate orchestration of circuit designs and activations and enable a selected set of a plurality of subscribers and a selected set of sites to be configured for access to one or more cloud service providers.

Figure 7:
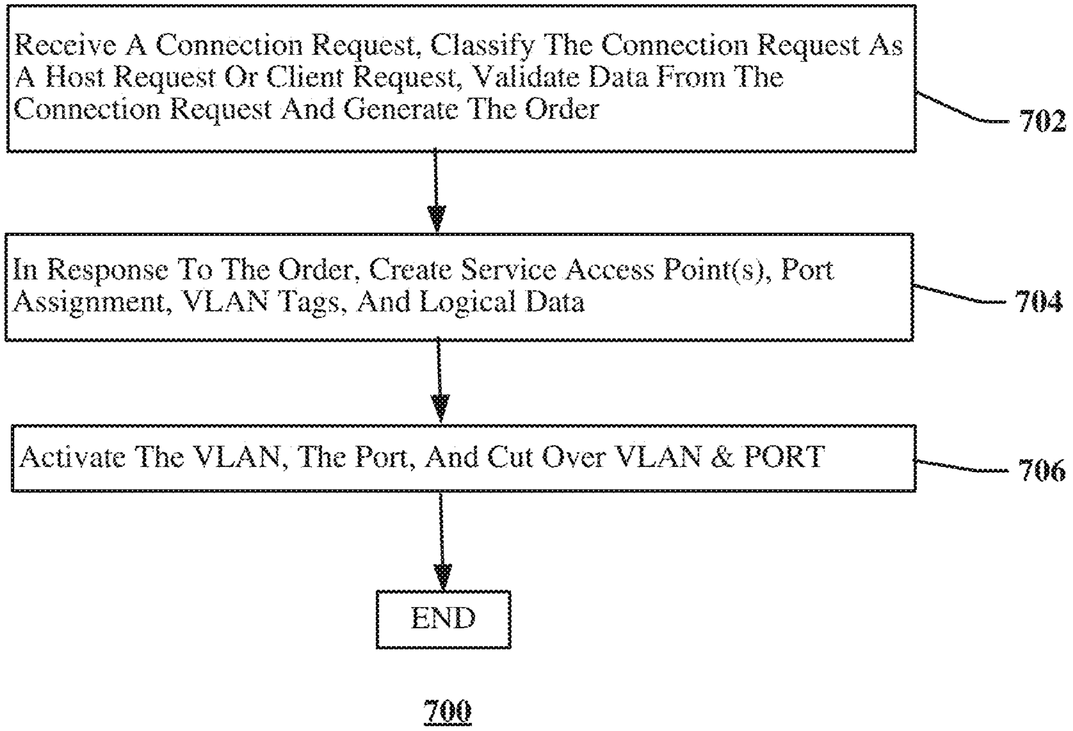
FIG. 7 depicts an illustrative embodiment of a workflow in accordance with various aspects described herein.

FIG. 7 depicts an illustrative embodiment of a workflow 700 in accordance with various aspects described herein. In various embodiments, a connection request is received from one of the subscriber networks and data from the connection request is validated (at 702). Upon validation of the data, an order is generated (at 702). For enhanced user experience, network connection requests or orders that fail to be processed may be auto-canceled so that remnants of an erroneous order do not persist and users can resubmit an updated order.

In response to the order, the workflow engine operates to create service access point(s), create port assignment to be used for connections, create VLAN tags, and create logical data (at 704). In some embodiments, port assignments may be displayed as a default selection for users or subscribers when the connection request is made via the portal 210. Users or subscribers may provide a VLAN identifier. As a next step, the workflow engine operates to activate the VLAN and the port (at 706). Then the workflow engine performs a cut over the VLAN and the port (at 706). Cutover is a stage in the workflow where all the segments that comprise the service enablement are completed and all intermediate states are no longer valid and the end state is made permanent.

In various embodiments, the network connection activation/deactivation platform 200 may augment and enhance the existing telecommunication services provided by the service provider and speed-to-market or faster deployment is possible. Users including customers, the service provider, etc. are familiar with the task flow and terminology and need less training. This the network connection activation/deactivation platform 200 allows customers or users to add and remove augmented features without service disruption. Users does not need separate access facilities which has the maximum lead time, particularly if a third party service provider is involved. Users manage the services via the network connection activation/deactivation platform 200 which may be in the form of a self-service portal, on-demand and near real-time activation. Services are provided on a secure network which is managed and monitored continuously for security breach or intrusion.

In various embodiments, the network connection activation/deactivation platform 200 eliminates the need for multiple work centers, within the service provider, to intercept customer orders toward fulfillment and provides a near real-time no-touch service enablement.

In various embodiments, the network connection activation/deactivation platform 200 classifies the participating subscriber connections as a 'Host' or 'Client' so that inter-company interactions are enabled. That way, services can be exchanged dynamically by configuring inbound/outbound packet filtering and assigning unique host identifiers on the interconnecting VPN/VRF. The network connection activation/deactivation platform 200 also extends the connectivity solutions across telecom model layers and make solutions agnostic to the underlying UNI service. Specifically, the industry is moving towards connectivity to the cloud service providers and the network connection activation/deactivation platform 200 enables the cloud service provider connectivity on the existing customer's access facilities.

While for purposes of simplicity of explanation, the respective processes are shown and described as a series of blocks in FIGS. 5-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
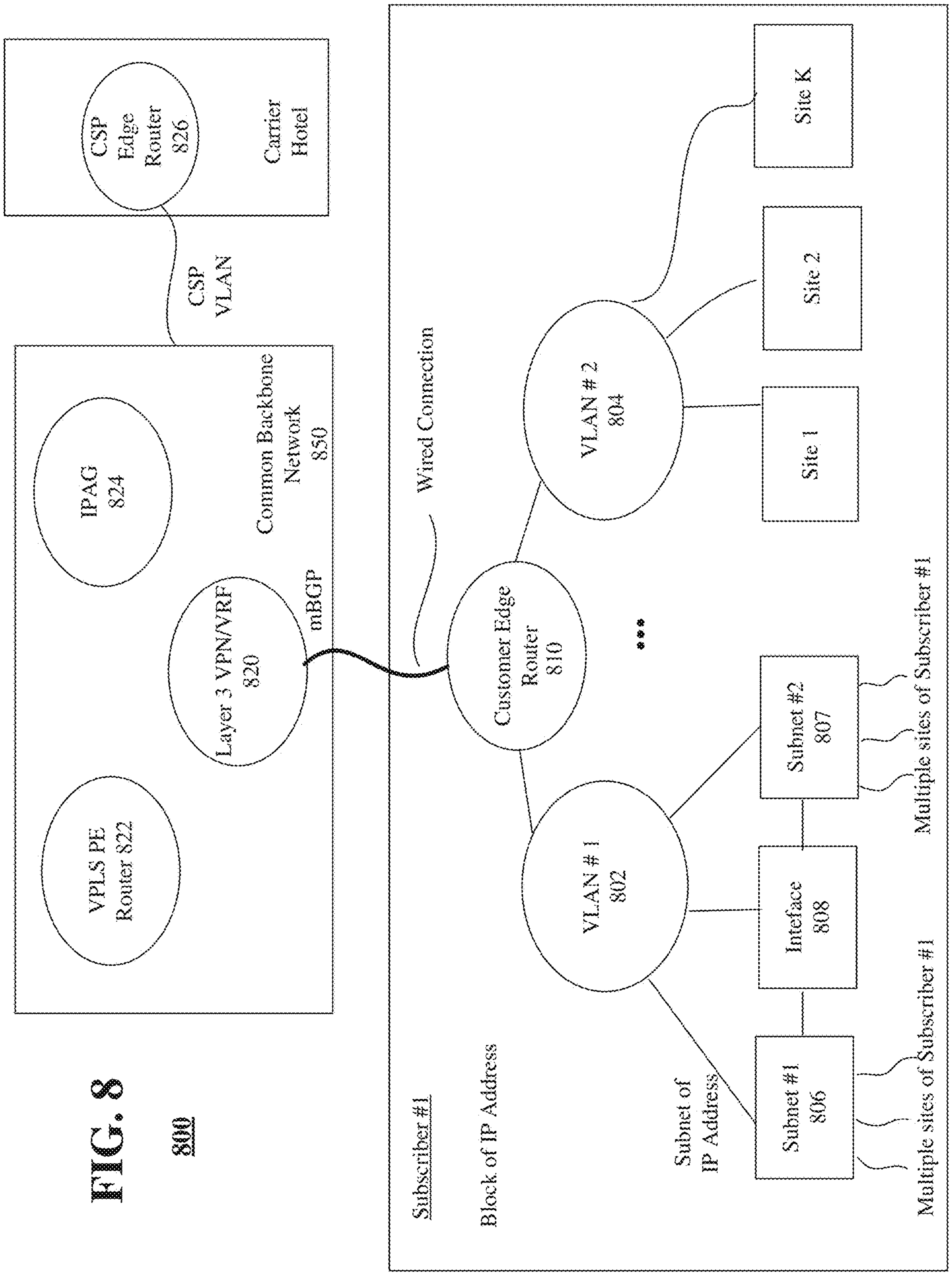
FIG. 8 is a block diagram illustrating an example, non-limiting embodiment of an intra-enterprise connection platform to a cloud service provider in accordance with various aspects described herein.

FIG. 8 is a block diagram illustrating an example, non-limiting embodiment of an intra-enterprise connection platform 800 functioning within the communication network of FIGS. 2 through 4 in accordance with various aspects described herein. As described above in conjunction with FIGS. 2 through 4, traditional telecommunication wireline services include connectivity of multiple sites of a given customer (i.e., a single enterprise) at a network/link layer, i.e., Layer 2 of the OSI model. A service provider of traditional telecommunication wireline services provides connection services via the switched, shared or dedicated Ethernet connections and LAN, VLAN and/or WAN services using wireline systems. These services may have a global presence and subscribers of the traditional telecommunication wireline services may subscribe to these products and services to interconnect their locations domestically and/or overseas.

At least some of subscribers may be served via the entire topology of their access through the service provider's network or using external providers (e.g., First Group in FIG. 3). Telephone services by the service provider corresponds to VoIP service, which is an IP service that subscribers have access. The service provider's physical wires are present between the subscriber's site(s) and a point of presence by the service provider. Additionally, the service provider can partner with several external carriers (ESP) (e.g., Second Group as depicted in FIG. 3) in order to fulfill the connectivity needs even if the entire topology of the wireless network infrastructure may not be fully owned and operated by a particular service provider.

Subscribers of the traditional telecommunication wireline services may desire to access services outside of their LAN/VLAN/WAN nodes. In various embodiments, the service provider may enhance connection services to cross communication layers (e.g., Layer 2) and access services using Layer 3 or IP Layer protocols. For example, Business-to-Business (B2B) services provided by large enterprises, or Business-to-services provided by cloud service providers (B2CSP), may be in part implemented with inter-enterprise or intra-enterprise connection platforms that can be established, scaled and maintained with reliability and resiliency as described herein.

Otherwise, subscribers may try to procure an alternate access to these cross layer services, apart from their existing facilities. This may entail the situation where a large enterprise needs to interconnect and access multiple locations across the globe. Such a discrete, repetitive connection approach may come with higher cost and management inefficiency, along with drawbacks of involving multiple local carriers, different billing cycles and local tax implications depending on geographical locations of the sites, additional customer premise equipment to support multiple services and complexity of handling support services and outages.

The present disclosure is directed to an intra-enterprise connection platform 800 to a cloud service which provide an enterprise wide solution. All locations of the same enterprise can be provided with access to products and services that can simplify and facilitate ordering of the connection to cloud service provider(s) and enable service activations, monitoring and service assurance. While the prevailing connectivity may not involve a BGP connection with IP addresses, the intra-enterprise connection platform 800 implements on-demand provisioning and activation of a BGP based VLAN such that a well-defined interface to cloud service providers is established based on established standards.

Although FIG. 8 depicts Subscriber #1, the intra-enterprise connection platform 800 using multi Border Gateway Protocol (mBGP) includes a plurality of subscribers, such as the first group of subscribers #1~#N and the second group of subscribers #M~#M+K, as depicted in FIG. 3. In some embodiments, Subscriber #1 is a large enterprise and includes multiple sites at different network locations or geographical locations. By way of example, Subscriber #1 may be a chain of hotels having twenty (20) different locations. As depicted in FIG. 8, the multiple sites of Subscriber #1 are interconnected via ethernet connections in a wired system, provided by the service provider, which is a part of existing services offered by the service provider. As described above, the switched, shared or dedicated ethernet connection involves a Layer2 connection of the OSI model and does not use an IP address or a Border Gateway Protocol (BGP). The BGP manages how packets are routed between autonomous systems which are managed by one entity or an internet service provider. The BGP makes routing decisions based on paths, which are defined by relevant rules and policies. Each router maintains a routing table controlling how packets are routed and a BGP process generates routing table information on the router based on incoming information from other routers and in the BGP routing information base (RIB). The RIB includes information from external router peers, internet router peers, and based on policies. The BGP is based on TCP/IP. i.e., Layer 4 and Layer 3 of the OSI model. The current version of the BGP supports both IPv6 and Classless Inter-Domain Routing (CIDR). The CIDR enables more IP addresses to be available within a particular network. Additionally, the multiple sites of Subscriber #1 are connected via a Layer2 Virtual Private Network (VPN).

In some embodiments, the multiple sites of Subscriber #1 are connected via a Virtual Private LAN Services (VPLS), which is as an Ethernet-based point-to-multipoint Layer2 VPN, as described above. The VPLS allows geographically dispersed Ethernet local area networks (LAN) sites including the multiple sites of Subscriber #1 to connect each other across an MPLS backbone of the service provider. For Subscriber #1, all of the multiple sites appear to be in the same Ethernet LAN even though traffic travels across the service provider's network. The VPLS is similar to the Layer2 VPN in its implementation and configuration. For the VPLS, packets can traverse the service provider's network in point-to-multipoint fashion such that a packet originating from a customer edge device can be broadcast to all the PE routers participating in a VPLS routing instance. In contrast, the Layer 2 VPN forwards packets in point-to-point fashion.

In some embodiments, a packet originating within Subscriber #1's network is sent first to a customer edge (CE) device 810 (for example, a router or Ethernet switch). Then the packet is sent to a provider edge (PE) router 822 within the service provider's backbone network 850. The packet traverses the service provider's network over an MPLS label-switched path (LSP). The packet arrives at a provider egress (PE) router, which then forwards the traffic to the customer edge device at a destination customer site, as depicted in FIG. 4.

In various embodiments, one or more multiple sites of Subscriber #1 desire to access cloud services. As described above, cloud services can provide scalability and efficiency to businesses, large or small. By using the intra-enterprise connection platform 800, Subscriber #1 can establish a connection to the cloud services such that multiple sites/locations within the same enterprise (Subscriber #1) can connect to a target cloud service provider. By using the intra-enterprise connection platform 800, Subscriber #1 can manage the connection of the multiple sites/locations to the target cloud service provider by adding, deleting, or modifying one or more of the multiple sites/locations. By using the intra-enterprise connection platform 800, Subscriber #1 can customize connection attributes such as bandwidth, packet filtering attributes, IP address types (IPv4/IPv6), service locations, etc. Subscriber #1 can manage, order, modify and manipulate the connection to the target cloud service provider on an on-demand basis. In addition, Subscriber #1 can manage, order, modify and manipulate the connection to the target cloud service provider as orderable items.

In various embodiments, the service provider may offer the access to cloud services as a part of the existing services, extensions to the existing service, or a new service. The service provider provides the interconnection among the multiple sites/locations of Subscriber #1 using the wired systems and the access to cloud services can be implemented based on establishing a Layer 3 VPN on a provider edge router and peering the provider edge router with a customer edge router of Subscriber #1. Based on connection needs, Subscriber #1 can generate one or more VLANs having multi-subnet configurations in which the multiple sites/locations of Subscriber #1 are enabled to be connected with the target cloud service provider using the Layer 3 VPN over a common backbone network of the service provider. In addition, the service provider provides a block of IP addresses to Subscriber #1 which manages the multiple sites/locations thereof by carving out sub IP addresses using subnet masking for use by the multiple sites/locations as needed.

In various embodiments, in order to access the cloud service provider, the intra-enterprise connection platform 800 establishes a Layer3 VPN alongside the existing Layer 2 VLAN and the Layer 3 VPN utilizes a Layer3 VPN/VRF 820 with respect to Subscriber #1. The customer edge router 810 peers with the service provider router 820 which contains a routing table specific to Subscriber #1. The mBGP is utilized to connect the Layer 2 VLAN to the Layer 3 VPN. The mBGP allows address families to be distributed in parallel by supporting IPv4 and IPv6 addresses. The mBGP is utilized with the MPLS Layer 3 VPN in order to exchange VPN labels from the sites of Subscriber #1 over the service provider's backbone network 850 such that traffic from Subscriber #1's sites can be distinguished over traffic from different subscribers' sites for routing.

In some embodiments, Subscriber #1 can determine a number of sites requiring the Layer 3 VPN service to the target cloud service provider and setup a VLAN on the Layer 3 router 820 with mBGP. The network operator of Subscriber #1 will then be able to add additional sites with the Layer 3 routing automatically established or remove existing sites, without involving the service provider.

FIG. 8 further depicts VLAN #1 802 in which the multiple sites of Subscriber #1 are connected. The communication via VLAN #1 802 is secured via a Layer 2 VPN, and no IP address or BGP session is used. A single VLAN can handle a plurality of intra-enterprise sites as long as the number of the sites are not too many or each site does not generate traffic simultaneously. In various embodiments, if the number of the sites may exceed a certain threshold, a subnet such as Subnet #1 and Subnet #2, 806 and 807 can be established. The sites grouped in different subnets can communicate via an interface 808. In some embodiments, the interface 808 may include a Layer 3 switch or a router.

In various embodiments, a multi-subnet based mBGP VLAN configuration is used in order to extend support to intra-enterprise connections involving the enterprise and multiple sites within the enterprise, irrespective of a number of nodes or sites in a particular region of an existing VPN. In some embodiments, nodes can be added and deleted as needed by a network operator of Subscriber #1. When external services such as B2B or B2CSP are available, adding and/or deleting the entities' sites "within" the same enterprise may not impact other existing sites. For instance, if there are more than 3 and up to N sites, the connectivity is established on a multipoint VPN. Adding additional nodes may not change the characteristics of the routing instance configured for Subscriber #1. When a cross layer connectivity solution is required, any one of the nodes, preferably the closest to the location of a cloud service, may be selected to be a primary access location.

In various embodiments, the common backbone network 850 of the service provider carries all the traffic that is destined from one customer to the other, whether it is for their interconnectivity for VPN services or whether they are going to the public internet. Connecting to the phone network for voice services, all this traffic goes through this common backbone. As described above, the common backbone network 850 may be labeled as an MPLS backbone, and it is a multiprotocol label service, carrying all kind of traffic, IP traffic, voice traffic, TDM traffic. The common backbone network 850 can include a common trunk that carries the traffic from the various subscriber locations. The entire backbone may be available to subscribers and is a private network. Subscribers can be benefited by security embedded with a private backbone network, unlike a public network.

As depicted in FIG. 8, the common backbone network 850 supports Layer 2 networks and Layer 3 networks of different subscribers. A plurality of routers having different functions and supporting different layers co-exist and run on the common backbone network 850 such as VPLS PE routers 822, Layer 3 VPN/VRF instances 820, and IP traffic aggregation (IPAG) 824. A certain number of subscribers of a particular service provider does not readily have a framework available to access cloud service providers as such subscribers is connected at a Layer 2 connectivity level. The subscribers with the Layer 2 connectivity level, may not be readily eligible or capable of accessing the cloud service provider. As long as the subscribers connect their internal sites or their various locations and do not interact with another entity outside of their core constituency or their own enterprise, the Layer 2 connectivity level may be sufficient and a BGP session may not be needed. A BGP session, however, may be used in order to communicate with cloud service providers. A routing protocol or a routing algorithm standard enables the communication with the cloud service providers.

Figure 9:
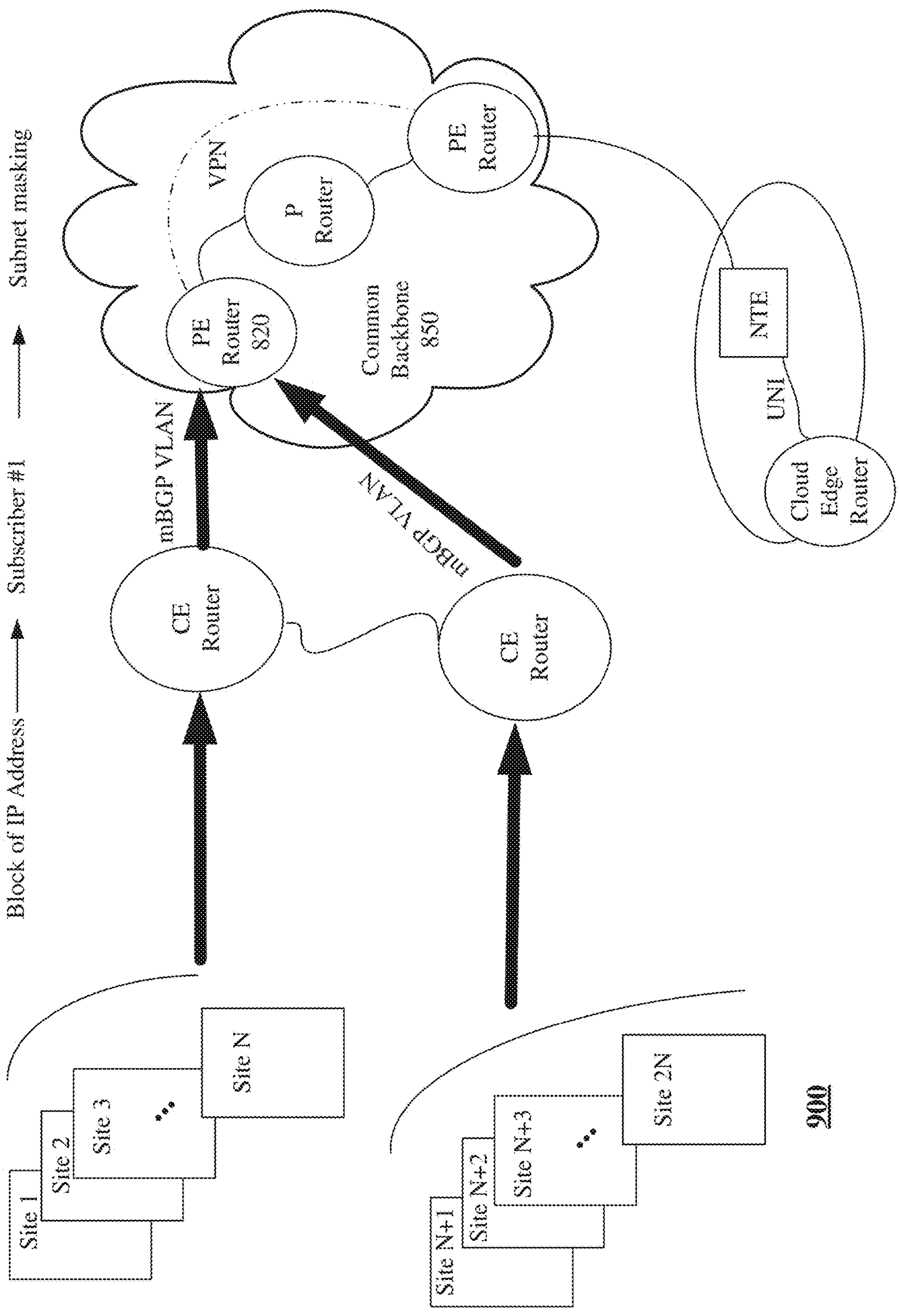
FIG. 9 illustrates a block diagram of assigning a subnet in accordance with various aspects described herein.

FIG. 9 illustrates a block diagram of a multi-subnet structure 900 in accordance with various aspects described herein. In some embodiments, a single VLAN can handle the throughput of up to N (e.g., 60) sites considering that not all sites will be simultaneously generating traffic. If the number of sites exceed N, a second subnet will be established for the remaining sites up to the next limit, as depicted in FIG. 9. If the number of sites exceed 2N, a third subnet will be established, and so on. This mBGP VLAN configuration with multiple subnets can be scaled and managed for a large number of nodes to access the Layer 3 based B2B or B2CSP sites. With respect to the mBGP session configuration, a subnet range is provided, instead of a single IP address, such that IP addresses from subnet masking can be used for a plurality of nodes (i.e., the multiple sites of the target subscribers) to access the Layer 3 based a B2B or B2CSP Host site.

In some embodiments, this multi-subnet structure 900 allows the service provider to provide interconnecting solutions that can be agnostic to a number of nodes or sites of subscribers. The number of nodes or sites that subscribers currently have can potentially grow a different number of nodes or sites as needed. For instance, referring back to FIG. 8, Subscriber #1 may be merged with another entity and upon a merger, a plurality of new sites (Site 1, Site 2, . . . . Site K) need to be added. Subscriber #1 then can generate a new VLAN (VLAN #2, 804) that connects the new sites. In some embodiments, the service provider provides a block of IP addresses to Subscriber #1 which in turn carves out IP sub addresses using subnet masking and assign IP sub addresses to the multiple sites under the multi-subnet. Accordingly, the multi-subnet structure 900 will be highly valuable in various use cases, such as mergers and acquisitions of corporations where the combined entity may need to provide identical connectivity solutions without the limitation by the number of locations. Additionally, the multi-subnet structure 900 supports dual stack addresses (i.e., both IPv4 and IPv6 address families), thereby allowing subscribers to adopt either IPv4 or IPv6 address families.

For instance, 60 addresses can be allocated for a subnet. A particular VLAN is created from a Dallas location to a Dallas cloud service provider. Subscriber #1 can have up to 60 sites configured and for more than 60 sites, another location, such as Atlanta closest to one of other sites of the target subscriber, can be selected. Another BGP session is created and the subscriber is provided with another block of 60 addresses. This process may go on according to a number of sites of Subscriber #1. When Subscriber #1's sites are getting added or removed, the service provider may not receive a notification, once and after a block of IP addresses is provided to Subscriber #1. The network operator of Subscriber #1 can manage and manipulate the IP addresses among the multiple sites.

In some embodiments, VLANs such as VLAN #1 802 (shown in FIG. 8) concurrently carry traffic using different subnets to comply with and accomplish the access-to-Layer 3 requirements. These VLANs will conform to the mBGP protocol accordingly. The connectivity to the cloud service providers over the common backbone network 850 can be established and UNI established from the carrier hotel can be accessed as depicted in FIG. 9.

By utilizing the multi-subnet configuration, the intra-enterprise connection platform 800 can aggregate all the traffic from Subscriber #1's multiple sites into one location and then create the Layer 3 VPN/VRF from the one location, which enables the subscriber's multiple sites to communicate with the cloud service provider. With the Layer 3 VPN, a Layer 3 IP service becomes available for the multiple sites of Subscriber #1 which are connected via the switched, shared or dedicated ethernet and the Layer 2 VLAN. In other words, the intra-enterprise connection platform 800 can aggregate all the traffic from the multiple sites and then create one big pipe that connects to the cloud service providers. As this configuration can be done on an on-demand basis, no pre-assigned or pre-designed hardware may be involved.

Figure 10:
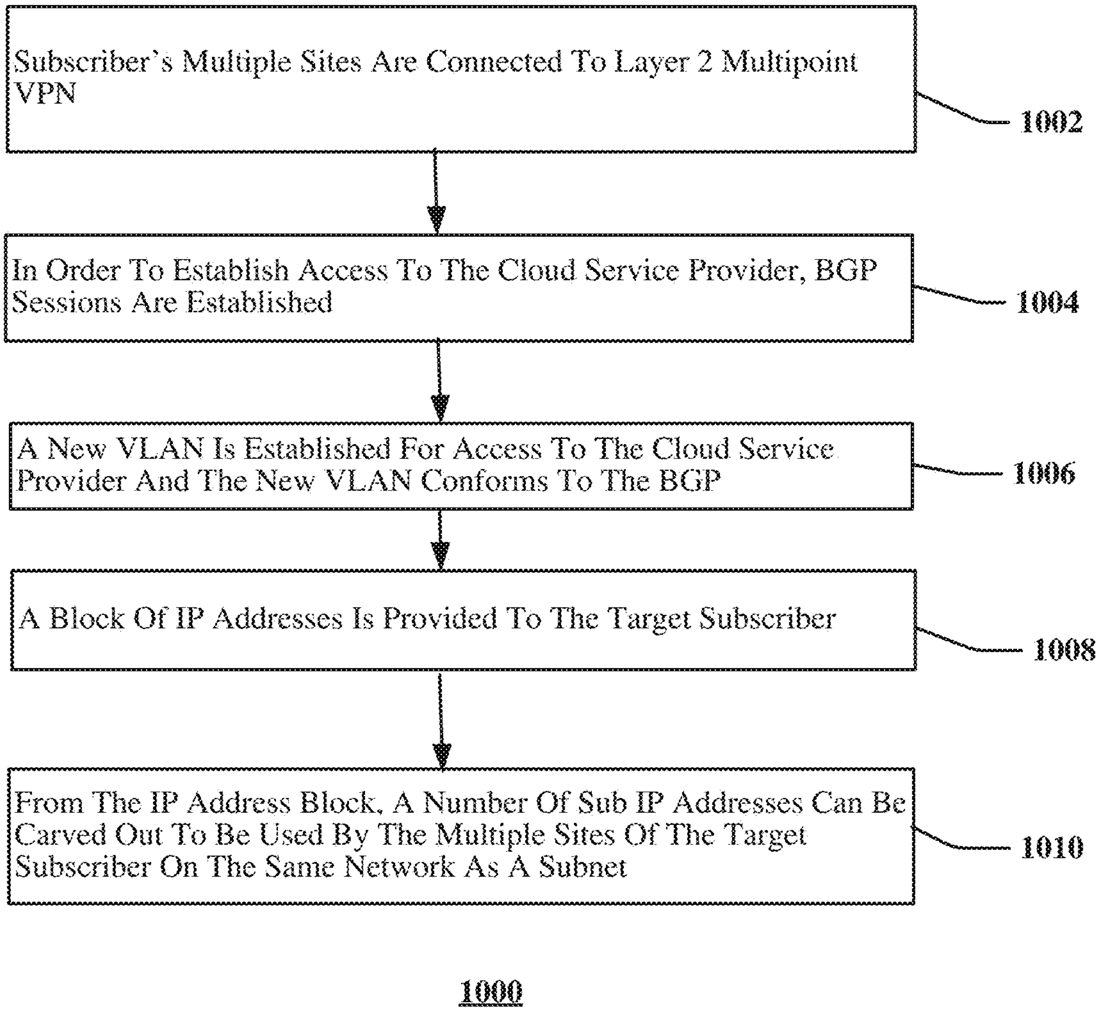
FIG. 10 depicts an illustrative embodiment of a method in accordance with various aspects described herein.

FIG. 10 depicts an illustrative embodiment of a method 1000 in accordance with various aspects described herein. At 1002, a target subscriber's multiple sites are connected to the Layer 2 VPN, as described above. In various embodiments, in order to establish access to the cloud service provider, BGP sessions are established (at 1004). For the access to the cloud service provider, a new VLAN is established (at 1006). In some embodiments, the new VLAN conforms to a BGP protocol. As described above, the BGP manages how packets are routed between autonomous systems, which are managed by one entity or an internet service provider. The BGP makes routing decisions based on paths, which are defined by relevant rules and policies. Each router maintains a routing table controlling how packets are routed and a BGP process generates routing table information. The current version of the BGP supports both IPv6 and the CIDR.

With respect to the target subscriber, the new VLAN may include one or more subnets. To facilitate the one or more subnets, a block of IP addresses is provided to the target subscriber (at 1008). More specifically, from the IP address block, a number of sub IP addresses can be carved out to be used by the multiple sites of the target subscriber on the same network as a subnet. In some embodiments, a block of address is reserved for a subnet. Within an IP address range, addresses can be carved out depending on the address mask. Using the subnet masking, all locations of the target subscriber can be assigned with one IP address from the block of IP addresses (at 1010). In some embodiments, a customer edge wide area network (WAN) address of IPv6 family is assigned. Optionally, IPv4 family may be assigned if the IPv4 family is not provided by the CSP.

FIG. 11 illustrates a block diagram of IP addresses relating to subnets in accordance with various aspects described herein. FIG. 11 illustrates a number of IP Addresses and a number of usable IP addresses using the subnet mask. For the subnet mask. 255.255.255.255, only one IP address is available, but for the subnet mask, 255.255.248.0, a total of 2.048 IP addresses are available. In some embodiments, among the number of IP addresses, one address is used for the router and another address is used for a broadcast domain to communicate with all the sub addresses or the sites. So the remaining IP addresses (i.e., the number of usable IP addresses) can be used by the multiple sites of the target subscriber. By way of example only, the subnet mask having the CIDR/26 will result in 64 IP addresses. Two IP addresses will be allocated to a router and for a broadcast in each subnet and thus, a total of 62 IP addresses become available.

Figure 12:
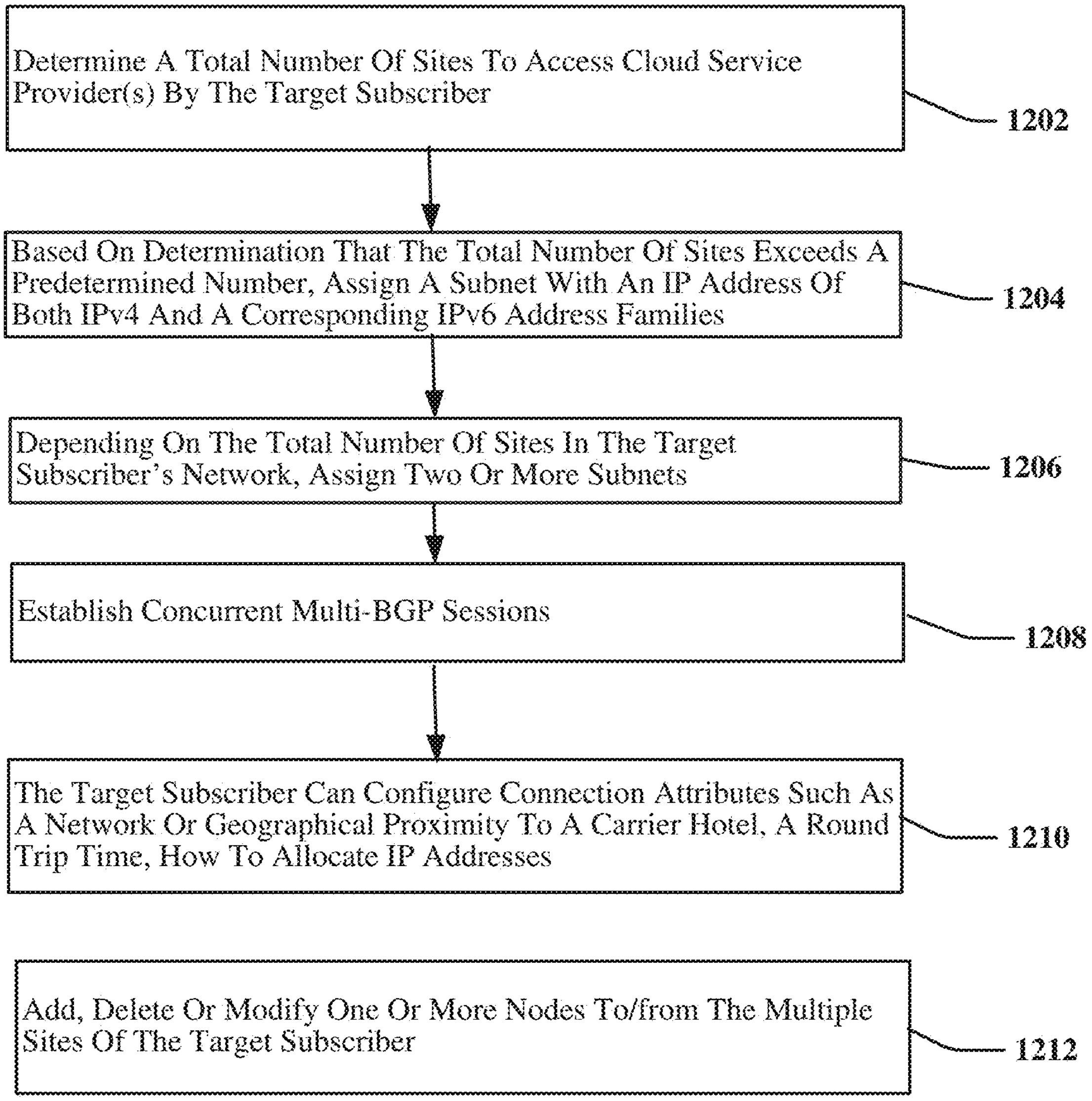
FIG. 12 depicts an illustrative embodiment of another method in accordance with various aspects described herein.

FIG. 12 depicts an illustrative embodiment of another method 1200 in accordance with various aspects described herein. Handling the entire sites of the target subscriber may be inefficient for the internal management as the target subscriber may need to add, remove, and/or close site(s). For instance, the target subscriber may experience organizational changes such as a merger, a sell-off, etc. In order to have a manageable number of sites, the target subscriber can be assigned with a block of addresses and have the connection to the cloud service provider.

In various embodiments, the target subscriber determines a total number of sites that require access to the cloud service provider (at 1202). For a subscriber who has 100 or fewer sites, one VLAN having all the sites thereunder may not be desirable. This is because potential management issue of all the routing and on the router configuration may arise and throttling all this traffic through one VLAN may have a latency issue and traffic congestion. In addition, it would be more desirable that, when one connection goes down, the other connections will be up and some of the sites will still be able to access the cloud provider service. Multiple BGP sessions may be established when the target subscriber sites are more than what is normally manageable, for example, the subscriber sites may be restricted to a certain number such as “60.” Upon determination that the total number of sites exceeds a predetermined number (e.g., “60”), a subnet is assigned (at 1204). In some embodiments, a single VLAN can handle the throughput of up to N (e.g., 60) sites considering that not all sites will be simultaneously generating traffic. If the number of sites exceed N, a second subnet will be established for the remaining sites up to the next limit (at 1206). If the number of sites exceed 2N, a third subnet will be established, and so on (at 1206). In some embodiments, IPv6 and IPv4 address mapping persist with a mBGP connection identifier.

As a result, concurrent multi-BGP sessions are established (at 1208). In some embodiments, the target subscriber can configure connection attributes (at 1210). For instance, not all the access connections need to be configured to go to the cloud service provider. One connection or one access, which is closest to the carrier, can be selected and configured. For instance, if a carrier hotel is in Dallas, and the target subscriber has headquarters in Dallas, Dallas Access connection can be used as a primary location for extending this multi-BGP VLAN. If the target subscriber is in Atlanta and there is a carrier Hotel location, a choice of geographical closeness or proximity can be considered at least for the sites in Atlanta, in order to have better traffic and better latency.

In various embodiments, a network operator of the target subscriber may decide a round trip time, locations, etc. Specifically, the network operator may determine, among all the sites, a primary location for the access. Then from that access, the multi-BGP session is extended and for each of these sites under the multi-BGP session, an IP address can be carved out. In some embodiments, the IP address may not be allocated for each of their site. Rather than the service provider, the network operator of the target subscriber or a local network management may decide how to assign IP addresses to the various sites and the routers. In other words, the service provider provides a block of IP addresses to the target subscriber and then, allocation of the IP addresses to the target subscriber's intra-enterprise sites can be determined at the subscriber level.

In various embodiments, IPv4 address may be used by the target subscriber, but the service provider may allocate IPv6 address as a default to facilitate services based on both IPv4 addresses and IPv6 addresses. The dual stack configurations of IPv4 and IPv6 addresses become available at each subscriber location or a customer edge router thereof. For instance, when the target subscriber provides an IPv4 address, the service provider may take “/26” according to CIDR notations as shown in FIG. 11. In some embodiments, IPv6 and IPv4 address mapping persist with a mBGP connection identifier.

In various embodiments, the target subscriber is enabled to add, remove or modify one or more sites to connect with the cloud service provider (at 1212). The target subscriber can select network setup attributes (such as bandwidth) among the multiple sites within its own network without requiring new hardware equipment or other resources. The target subscriber also can pick and choose or change cloud service providers as needed. Additionally, the target subscriber can choose two or more different cloud service providers depending on their locations. This arrangement allows the target subscriber to continue to perform even if one of the cloud service providers may have service issues. The target subscriber can have all these combinations of carriers and sites so that they can assure that their services are continuously available.

For instance, 60 addresses can be allocated for a subnet and 60 corresponding addresses in IPV 6 address family are maintained in internal tables on the service provider routers. For example, a particular VLAN is created from a Dallas location to a Dallas cloud service provider. The target subscriber can have up to 60 sites configured and for more than 60 sites, another location, such as Atlanta closest to one of other sites of the target subscriber, can be selected. Another BGP session is created and the subscriber is provided with another block of 60 addresses. This process may go on according to a number of sites of the target subscriber. When the target subscriber sites are getting added or removed, the service provider may not receive a notification once and after a block of IP addresses is provided to the target subscriber. The network operator of the target subscriber manage and manipulate those addresses among the multiple sites.

In various embodiments, the subscriber may desire to bring in and add additional 50 sites, for example (at 1212). For the additional 50 sites, the Layer 2 connectivity (i.e., a VLAN) is established and when the BGP is established, all of the new sites may automatically get access to the cloud service provider.

In other embodiments, the target subscriber may choose a location in light of business considerations. For instance, a carrier hotel is present in Dallas, but the target subscriber may choose to go from Austin because the target subscriber may have some plans to close the Dallas location soon. Even though a different and/or better option is available, the subscriber's selection may not be overridden by the intra-enterprise connection platform 800. In some embodiments, the intra-enterprise connection platform 800 can suggest a good match between the subscriber's locations and the cloud service provider's locations, based on locations and the availability of the cloud services.

In various embodiments, the intra-enterprise connection platform 800 may be implemented with a stack of applications rather than a single application. In some embodiments, the stack of applications include workflow embedded provisioning and activation applications. There are many layers and in one of the layers, subscribers can see what services are available and if subscribers wants one of those services, select a host which will provide desired services. Additionally, or alternatively, different cloud service providers can provide the same service and thus, subscribers can choose any one or all of cloud service providers. Upon selection of the host or one or more cloud service providers, a handshake process takes place. And then a requirement or an order is received from an upstream system such as an end user interface, and then the connectivity is established.

In various embodiments, as described above in connection with FIGS. 2 through 4, the intra-enterprise connection platform 800 may have a user interface such as the portal 210 which facilitates a subscriber or a network operator of the subscriber to activate or deactivate and manage connection requests of its multiple sites to the cloud service provider. Instead of establishing individual connection by each site of the subscriber, the subscriber makes the connection to the cloud service provider for its multiple sites and adds, deletes or modify its multiple sites as needed or as changed. In some embodiments, the subscriber can initiate and make decisions for selecting locations, and various network connection attributes and parameters relating to the connection request. Additionally or alternatively, artificial intelligence and machine learning techniques may be used to determine locations of a primary access point and a cloud service provider/a carrier hotel. As another example, a carrier whom the subscriber wants to connect with may be near one of the locations of the subscriber and the subscriber can choose that location as the primary location. Via the user interface as the portal 210, the subscriber checks its sites and a host and will determine a geographical proximity that is the closest so that the traffic or the congestion may be avoided and the latency time or the round trip time may be shorter.

In various embodiments, the intra-enterprise connection platform 800 can be implemented and located in data centers. Alternatively, the intra-enterprise connection platform 800 may be located in the cloud at least in part or in its entirety.

As described in the above embodiments, the subscriber have the existing Layer 2 interconnection via the switched, shared or dedicated ethernet of a particular service provider. The subscriber can communicate with the cloud service providers via an IP layer and Layer 3 services are established. Additionally, or alternatively, some subscribers may have access to Layer 3 services like a Layer 3 VPN having IP addresses established on their customer routers. The common backbone network 850 as depicted in FIG. 8 can also facilitate the Layer 3 services.

While for purposes of simplicity of explanation, the respective processes are shown and described as a series of blocks in FIGS. 10 and 12, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

One or more of the embodiments described herein can be combined in whole or in part with the embodiments described in co-pending U.S. patent application Ser. No. 18/341,885, entitled "NETWORK CONNECTION ACTIVATION/DEACTIVATION PLATFORM," filed on even date herewith.

What is claimed is:

1. A device, comprising:

a processing system including a processor; and a memory that stores executable instructions that, when executed by the processing system, facilitate performance of operations, the operations comprising:

establishing a Layer 2 multipoint virtual private network (VPN) among a plurality of devices connected via a switched, shared or dedicated ethernet, wherein a group of the plurality of devices belong to a single entity network including a plurality of different sites;

connecting one or more participating sites among the plurality of different sites to a cloud service provider over a common backbone network by:

generating a VLAN that conforms to a Border Gateway Protocol (BGP);

assigning a block of IP addresses to the single entity network;

assigning a subnet having IP addresses of both IPv4 and IPv6 address families with respect to the VLAN;

configuring a Layer 3 routing instance on a provider edge router by mapping the IP addresses of both IPv4 and IPv6 address families to routes in a routing table contained in the provider edge router, thereby enabling the one or more participating sites to be configured to access the cloud service provider;

prompting an operator of the single entity network to select a plurality of network configuration attributes for the connection of the one or more participating sites to the cloud service provider, wherein the plurality of network configuration attributes includes:

circuit speed, class of service, VLAN tags, and IP address version;

receiving a connection request for establishing the connection of the one or more participating sites to the cloud service provider;

classifying the connection request as a host request or a client request;

in response to the classifying, initiating a handshake process between a first device associated with the connection request and a second device to identify and authenticate at least one of the first device, the second device, a first network associated with the first device, or a second network associated with the second device; and generating or assigning a unique host identifier associated with a host device for the connection request, wherein establishing the connection to the cloud service provider is conditioned on successful authentication by the handshake process.

2. The device of claim 1, wherein the operations further comprise determining a number of the one or more participating sites and based on the determined number, assigning two or more subnets, wherein IPv4 and IPv6 address mapping with a mBGP connection identifier persists.

3. The device of claim 2, wherein the operations further comprise:

based on comparison that the determined number is greater than a predetermined threshold (N), utilizing (N-2) IP addresses by the one or more participating sites.

4. The device of claim 2, wherein the operations further comprise establishing concurrent BGP sessions for the two or more subnets.

5. The device of claim 1, wherein the operations further comprise providing a workflow embedded provisioning and activation application that enables the operator of the single entity network to selectively activate or deactivate the connection of the one or more participating sites to the cloud service provider.

6. The device of claim 5, wherein the workflow embedded provisioning and activation application further enables the operator of the single entity network to add, remove or modify the one or more participating sites.

7. The device of claim 5, wherein the operations further comprise prompting the operator of the single entity network to select a second plurality of network configuration attributes.

8. The device of claim 7, wherein the second plurality of network configuration attributes comprises one or more circuits to be connected, bandwidth, a connection location of the single entity network to the cloud service provider, or a combination thereof.

9. The device of claim 8, wherein the second plurality of network configuration attributes comprises one or more circuits to be configured with packet filtering attributes that are unique based on a combination of the Layer 3 routing instance and a unique host identifier.

10. A non-transitory, machine-readable medium, comprising executable instructions that, when executed by a processing system including a processor, facilitate performance of operations, the operations comprising:

establishing a Layer 2 multipoint virtual private network (VPN) among a plurality of sites connected via a switched, shared or dedicated ethernet provided by a service provider, wherein the plurality of sites correspond to multiple locations of a target enterprise;

determining a count of the plurality of sites that requires a connection to one or more cloud service providers over a common backbone network of the service provider;

generating a VLAN that conforms to a Border Gateway Protocol (BGP);

assigning a block of IP addresses to a network of the target enterprise;

based on the determined count, assigning two or more subnets having IP addresses of both IPv4 and IPv6 address families with respect to the VLAN;

connecting the plurality of sites to the one or more cloud service providers; and prompting an operator to select a plurality of network configuration attributes for the connection of the plurality of sites to the one or more cloud service providers, wherein the plurality of network configuration attributes includes: circuit speed, class of service, VLAN tags, and IP address version, wherein the connecting includes:

receiving a connection request for establishing the connection;

classifying the connection request as a host request or a client request;

in response to the classifying, initiating a handshake process between a first device associated with the connection request and a second device to identify and authenticate at least one of the first device, the second device, a first network associated with the first device, or a second network associated with the second device; and generating or assigning a unique host identifier associated with a host device for the connection request, wherein establishing the connection is conditioned on successful authentication by the handshake process.

11. The non-transitory, machine-readable medium of claim 10, wherein the operations further comprise configuring a virtual routing and forwarding instance on a provider edge router of the service provider.

12. The non-transitory, machine-readable medium of claim 11, wherein the operations further comprise mapping the IP addresses of both IPv4 and IPv6 address families to routes in a routing table contained in the provider edge router, thereby enabling the plurality of sites to be configured to access the one or more cloud service providers.

13. The non-transitory, machine-readable medium of claim 10, wherein the operations further comprise establishing concurrent BGP sessions for the two or more subnets.

14. The non-transitory, machine-readable medium of claim 10, wherein the operations further comprise:

adding a new group of sites that requires the connection to the one or more cloud service providers over the common backbone network of the service provider; and generating a new VLAN that conforms to the BGP and connects the new group of sites.

15. The non-transitory, machine-readable medium of claim 10, wherein a set of nested workflows coordinates orchestration of a circuit design for and activation of the connection of the plurality of sites to the one or more cloud service providers.

16. A method, comprising:

connecting, by a processing system including a processor, a plurality of subscriber networks via a switched, shared or dedicated Ethernet using a wired network, wherein the plurality of subscriber networks includes a first network and a second network;

providing, by the processing system, an application that enables a user to selectively activate or deactivate a first network connection between the first network and a cloud service provider and a second network connection between the first network and the second network;

receiving, by the processing system, a request for activating the first network connection;

determining, by the processing system, a number of sites within the first network that requires a connection to the cloud service provider over a common backbone network of a service provider;

generating, by the processing system, a VLAN that conforms to a Border Gateway Protocol (BGP);

assigning, by the processing system, a customer edge wide area network address of IPv6 family to the first network;

connecting, by the processing system, the number of sites within the first network to the cloud service provider; and prompting, by the processing system, an operator to select a plurality of network configuration attributes for the connection of the number of sites within the first network to the cloud service provider, wherein the plurality of network configuration attributes includes: circuit speed, class of service, VLAN tags, and IP address version, wherein the connecting of the number of sites within the first network to the cloud service provider includes:

receiving a connection request for establishing the connection;

classifying the connection request as a host request or a client request;

in response to the classifying, initiating a handshake process between a first device associated with the connection request and a second device to identify and authenticate at least one of the first device, the second device, a third network associated with the first device, or a fourth network associated with the second device; and generating or assigning a unique host identifier associated with a host device for the connection request, wherein establishing the connection is conditioned on successful authentication by the handshake process.

17. The method of claim 16, further comprising executing, by the processing system, a set of nested workflows which coordinates orchestration of a circuit design for and activation of the first network connection of the number of sites within the first network to the cloud service provider.

18. The method of claim 16, further comprising:

prompting via the application, by the processing system, a second plurality of network configuration attributes for selection by the user as an orderable item to the user; and based on the request for activating the first network connection, activating, by the processing system, the first network connection that follows the selected second plurality of network configuration attributes.

19. The method of claim 18, wherein the second plurality of network configuration attributes further comprise:

one or more circuits to be connected, bandwidth, a service location of a subscriber to the cloud service provider, or a combination thereof.

20. The method of claim 18, wherein the second plurality of network configuration attributes further comprise one or more circuits to be configured with packet filtering attributes, wherein the packet filtering attributes are based on a community value string of a router configuration as a combination of a Layer 3 routing instance and a unique host identifier.

* * * * *